(12) United States Patent
Makino

(10) Patent No.: US 9,694,426 B2
(45) Date of Patent: Jul. 4, 2017

(54) CUTTING TOOL

(71) Applicant: KYOCERA Corporation, Kyoto-shi, Kyoto (JP)

(72) Inventor: Takahiko Makino, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/769,989

(22) PCT Filed: Nov. 29, 2013

(86) PCT No.: PCT/JP2013/082221
§ 371 (c)(1),
(2) Date: Aug. 24, 2015

(87) PCT Pub. No.: WO2014/132512
PCT Pub. Date: Sep. 4, 2014

(65) Prior Publication Data
US 2016/0008891 A1 Jan. 14, 2016

(30) Foreign Application Priority Data
Feb. 27, 2013 (JP) .................................. 2013-037401

(51) Int. Cl.
| | | |
|---|---|---|
| B23B 27/14 | (2006.01) | |
| C22C 29/08 | (2006.01) | |
| C22C 29/02 | (2006.01) | |
| C22C 29/06 | (2006.01) | |
| C23C 28/04 | (2006.01) | |
| C23C 30/00 | (2006.01) | |
| B22F 5/00 | (2006.01) | |
| C04B 41/50 | (2006.01) | |

(52) U.S. Cl.
CPC ............ B23B 27/148 (2013.01); C22C 29/02 (2013.01); C22C 29/067 (2013.01); C22C 29/08 (2013.01); C23C 28/042 (2013.01); C23C 28/044 (2013.01); C23C 30/005 (2013.01); B22F 2005/001 (2013.01); B22F 2207/03 (2013.01); B23B 2222/28 (2013.01); B23B 2222/36 (2013.01); B23B 2222/88 (2013.01); B23B 2228/105 (2013.01); C04B 41/5098 (2013.01); C22C 2202/02 (2013.01)

(58) Field of Classification Search
USPC .......... 51/307, 309; 428/216, 336, 472, 697, 428/698, 699, 701, 702; 75/236, 240
See application file for complete search history.

(56) References Cited

U.S. PATENT DOCUMENTS

| | | | |
|---|---|---|---|
| 6,250,855 B1 * | 6/2001 | Persson ................... | C22C 29/08 51/309 |
| 6,273,930 B1 * | 8/2001 | Waldenstrom .......... | C22C 1/051 75/240 |
| 6,575,671 B1 | 6/2003 | North et al. | |
| 2003/0161695 A1 | 8/2003 | Grab et al. | |
| 2007/0148497 A1 * | 6/2007 | Sundstrom .............. | C23C 16/30 428/698 |
| 2008/0299366 A1 | 12/2008 | Ahlgren et al. | |
| 2008/0299383 A1 | 12/2008 | Martensson et al. | |
| 2009/0010724 A1 | 1/2009 | Norgren et al. | |
| 2009/0223333 A1 | 9/2009 | Tanibuchi | |
| 2012/0144753 A1 * | 6/2012 | Okuno .................... | C22C 29/08 51/295 |
| 2012/0219789 A1 | 8/2012 | Endler et al. | |

FOREIGN PATENT DOCUMENTS

| | | | |
|---|---|---|---|
| EP | 2008743 A1 | | 12/2008 |
| EP | 2 392688 | * | 12/2011 |
| EP | 2465960 A1 | | 6/2012 |
| JP | 05-320913 A | | 12/1993 |
| JP | 11-061317 A | | 3/1999 |
| JP | 11-197936 | * | 7/1999 |
| JP | 11-241138 A | | 9/1999 |
| JP | 2004-506525 A | | 3/2004 |
| JP | 2005-272877 A | | 10/2005 |
| JP | 2009-034811 A | | 2/2009 |
| JP | 2009-120903 | * | 6/2009 |
| JP | 2012-030308 A | | 2/2012 |
| JP | 2012-076156 A | | 4/2012 |
| JP | 2012-096353 A | | 5/2012 |
| JP | 2012-193406 A | | 10/2012 |
| JP | 5127477 B2 | | 1/2013 |

(Continued)

OTHER PUBLICATIONS

International Search Report, PCT/JP2013/082221, Feb. 18, 2014, 2 pages.
Japanese Office Action with English concise explanation, Japanese Patent Application No. 2014-158761, Apr. 21, 2015, 5 pages.
Korean Office Action with English concise explanation, Korean Patent Application No. 2015-7022533, Sep. 9, 2016, 7 pgs.
Extended European Search Report, European Patent Application No. 13876147.3, Nov. 7, 2016, 9 pgs.

*Primary Examiner* — Archene Turner
(74) *Attorney, Agent, or Firm* — Volpe and Koenig, P.C.

(57) ABSTRACT

There is provided a cutting tool having high wear resistance and fracture resistance by reducing the occurrence of thermal cracking on a cutting edge even during a cutting process of a heat-resistant alloy in which the cutting edge reaches high temperatures. The cutting tool is made from a cemented carbide that is composed mainly of a WC phase and contains 11.5-12.5% by mass of Co and 0.2-0.6% by mass of Cr in terms of $Cr_3C_2$. The WC phase has a mean particle size of 0.85-1.05 μm, an antimagnetic force (Hc) of 13.0-16.0 kA/m, and a Rockwell hardness (HRA) of 89.5-90.5.

7 Claims, No Drawings

(56) References Cited

FOREIGN PATENT DOCUMENTS

| JP | 2014-223722 | A | | 12/2014 |
|---|---|---|---|---|
| WO | 02/14569 | A2 | | 2/2002 |
| WO | 2008/026700 | A1 | | 3/2008 |
| WO | 2009/002266 | A1 | | 12/2008 |
| WO | 2009-070112 | | * | 6/2009 |
| WO | 2010/002344 | | * | 1/2010 |

* cited by examiner

CUTTING TOOL

TECHNICAL FIELD

The present invention relates to a cutting tool made from a cemented carbide.

BACKGROUND ART

A cemented carbide is suitably used in cutting tools conventionally widely used in metal cutting processes. With increasing demand for heat resistant alloys, such as Inconel and titanium, there has been a desire for a cutting tool that produces excellent cutting performance during cutting of the heat-resistant alloy. With the conventional cutting tools, however, the neighborhood of a cutting edge reaches high temperatures during the cutting. This leads to the problem that thermal cracking occurs on the cutting edge and a crack propagates from the thermal cracking, resulting in chipping and a fracture in the cutting edge.

Patent Document 1 discloses a cutting tool made from a cemented carbide that is composed mainly of WC and contains 12-14% by mass of Co and 0.3-0.6% by mass of Cr. The cemented carbide has an antimagnetic force (Hc) of 15-25 kA/m and a deflective strength of 3.5 GPa or more. Patent Document 1 describes that the cutting tool produces satisfactory cutting performance in a cutting process of heat resistant alloys, such as titanium and Inconel.

RELATED ART DOCUMENT

Patent Document

Patent Document 1: Japanese Unexamined Patent Publication No. 2012-076156

SUMMARY OF THE INVENTION

Problems to be Solved by the Invention

However, an insert of Patent Document 1 is minimally effective in reducing the occurrence of the thermal cracking and hence needs further improvement of the performance.

An object of the present invention is to provide a cutting tool having high wear resistance and fracture resistance by reducing the occurrence of thermal cracking on a cutting edge even during a cutting process of a heat-resistant alloy in which the cutting edge reaches high temperatures.

Means for Solving the Problems

The present invention has been made based on a finding that during the cutting process of the heat-resistant alloy, the cutting performance is not continuously changed but a remarkable improvement of the cutting performance appears in an extremely narrow specific range with respect to a mean particle size of a WC phase and contents of additives, such as Co and Cr($Cr_3C_2$) in a cemented carbide.

That is, the cutting tool of the present invention is made from a cemented carbide that is composed mainly of the WC phase and contains 11.5-12.5% by mass of Co and 0.2-0.6% by mass of Cr in terms of $Cr_3C_2$. The WC phase has a mean particle size of 0.85-1.05 μm, an antimagnetic force (Hc) of 13.0-16.0 kA/m, and a Rockwell hardness (HRA) of 89.5-90.5.

Effect of the Invention

The cutting tool of the present invention reduces the occurrence of thermal cracking on the cutting edge during cutting of the heat resistant alloy, and is excellent in both wear resistance and fracture resistance, thereby producing remarkably excellent cutting performance.

EMBODIMENTS FOR CARRYING OUT THE INVENTION

A cutting tool of the present embodiment is made from a cemented carbide that is composed mainly of a WC phase and contains 11.5-12.5% by mass of Co and 0.2-0.6% by mass of Cr in terms of $Cr_3C_2$. The WC phase has a mean particle size of 0.85-1.05 μm, an antimagnetic force (Hc) of 13.0-16.0 kA/m, and a Rockwell hardness (HRA) of 89.5-90.5. The cutting tool of the present embodiment that falls within these ranges reduces the occurrence of the thermal cracking on the cutting edge during the cutting of the heat resistant alloy, and is excellent in both wear resistance and fracture resistance, thereby producing remarkably excellent cutting performance.

That is, when the mean particle size of the WC phase is smaller than 0.85 μm, the cemented carbide is deteriorated in thermal conductivity and is also deteriorated in toughness and fracture resistance. Reversely, when the mean particle size of the WC phase is larger than 1.05 μm, the hardness and wear resistance of the cemented carbide are lowered. A more suitable range of the mean particle size of the WC phase is 0.95-1.05 μm. When the content of Co is less than 11.5% by mass, it is difficult to ensure sufficient toughness and strength, and a fracture is apt to occur. Reversely, when the content of Co is larger than 12.5% by mass, the thermal conductivity of the cemented carbide is lowered to cause thermal cracking, and a fracture is apt to occur. Further, plastic deformation resistance is deteriorated to accelerate wear growth on the cutting edge. A more suitable range of the content of Co is 12.0-12.5% by mass.

When the content of Cr in terms of $Cr_3C_2$ is less than 0.2% by mass, a bonding phase in the cemented carbide is apt to be oxidized and deformed. Reversely, when the content of chrome Cr in terms of $Cr_3C_2$ is more than 0.6% by mass, toughness is lowered and a fracture is apt to occur. A more suitable range of the content of Cr in terms of $Cr_3C_2$ is 0.4-0.5% by mass. The cemented carbide may include at least one of vanadium (V) and tantalum (Ta) whose sum in terms of carbide (VC and TaC) falls within a range of 0.2% by mass or less. In the present embodiment, chrome (Cr), vanadium (V), and tantalum (Ta) are solid-melted in the bonding phase.

When the antimagnetic force is lower than 13.0 kA/m, hardness is deteriorated, failing to produce sufficient wear resistance. Reversely, when the antimagnetic force is higher than 16.0 kA/m, thermal cracking is apt to occur, and fracture toughness is deteriorated to induce a sudden fracture. A more suitable range of the antimagnetic force is 13.5-15.0 kA/m.

When the Rockwell hardness (HRA) is lower than 89.5, the wear growth on the cutting edge is accelerated. Reversely, when the Rockwell hardness is higher than 90.5, toughness is deteriorated and stability against a fracture is deteriorated. Consequently, a tool damage, such as the sudden fracture, is apt to occur. A more suitable range of the Rockwell hardness is 89.8-90.3.

In the present embodiment, the cemented carbide has a deflective strength of 3.5 GPa or more and a Weibull coefficient of 10 or more. This ensures less defects of sintered bodies and less variations among the sintered bodies, thus suppressing the sudden fracture of the cutting tool. A desirable range of deflective strength is 3.7-4.2 GPa. A desirable range of Weibull coefficient is 15 or more. When a test piece shape for three-point bending strength based on JISR1601 is obtainable from the shape of the cutting tool in the present invention, the test piece based on JISR1601 is cut off and a three-point bending strength thereof is measured as in the three-point bending strength measurement according to JISR1601. When the test piece shape for the three-point bending strength based on JISR1601 is not obtainable from the shape of the cutting tool, the largest rectangular sample is cut off from the cutting tool and is made into a rectangular shape as a test piece, which has a depth-width-length ratio of 3:4:10 based on JISR1601. Using this as a test piece, the three-point bending strength is measured with a measuring span set at the same ratio as a longitudinal length of the sample.

In the present embodiment, saturation magnetization (Ms) is 165-200 kA/m. Within this range, the cemented carbide becomes a healthy alloy having neither a η phase nor free carbon precipitation. Here, an oxygen content in the cemented carbide is 0.03-0.10% by mass. A fracture toughness value ($K_{1C}$) of the cemented carbide is 16 MPa·m$^{1/2}$ or more, particularly 16.5-20.0 MPa·m$^{1/2}$.

The Co exists in the bonding phase that establishes a bond between the WC phases. The cemented carbide is composed mainly of the WC phases and has such a structure that the bonding phase composed mainly of the Co that establishes the bond between the WC phases. Tungsten (W) and chrome (Cr) are contained in the bonding phase and are solid-melted therein. It is possible to confirm as to whether to be solid-melted or not by observation with a scanning electron microscope (SEM) or transmission electron microscope (TEM). According to the present embodiment, a content ratio of tungsten in the bonding phase reaches a maximum value at a location between the surface and interior of the cemented carbide. The content ratio of tungsten in the bonding phase is preferably distributed so as to temporarily increase from the surface toward the interior of the cemented carbide until reaching the maximum value and then decreases toward the interior. The measurement is preferably made on a cross section including a surface of the cemented carbide not subjected to a polishing process. For example, the measurement is made on a cross section including an inner wall surface of a screw hole disposed at a middle part of the cutting tool.

Such a distribution that the content ratio of tungsten in the bonding phase reaches the maximum value at the location between the surface and interior of the cemented carbide is effective in ensuring that heat to be generated during cutting propagates efficiently. In the present embodiment, the location at which the content ratio of tungsten in the bonding phase reaches the maximum value lies at depths in a range of 50-200 μm from the surface of the cemented carbide. The location at which the content ratio of tungsten in the bonding phase reaches the maximum value may lie at a depth shallower than 50 μm from the surface of the cemented carbide or may lie at the outermost surface of the cemented carbide by subjecting the polishing process to a cutting edge part, a rake surface, and a flank surface after the cemented carbide is produced by sintering. In either case, the abovementioned effect remains unchanged.

(First Embodiment of Coating Layer)

The surface of the cemented carbide may be coated with a coating layer in the cutting tool of the present embodiment. For example, the coating layer is made by laminating in sequence a TiN layer having a mean thickness of 0-0.7 μm, a TiCN layer having a mean thickness of 1-3 μm, an intermediate layer having a mean thickness of 0-0.1 μm and being composed of any one of TiCO, TiNO, and TiCNO, an $Al_2O_3$ layer having a mean thickness of 0.3-0.7 μm, and an outermost layer made of a $TiC_xN_y$ layer (0<x, 0.5≤y, and x+y=1) having a mean thickness of 0-0.7 μm. A long-life cutting process in a milling process of a nickel-based alloy, such as Inconel, is attainable by coating the coating layer on the cemented carbide having the foregoing structure. The coating layer is produced by CVD method in the present embodiment.

A more suitable structure of the coating layer in the present embodiment is specifically described below. The coating layer is coated on the surface of a substrate composed of the cemented carbide, and includes, in ascending order from the substrate side, the TiN layer, the TiCN layer, the intermediate layer, the $Al_2O_3$ layer, and the outermost layer. The intermediate layer is composed of any one of TiCO, TiNO, and TiCNO. The outermost layer is made of the $TiC_xN_y$ layer (0<x, 0.5≤y, and x+y=1). A more suitable mean thickness of the TiN layer is 0.1-0.7 μm, that of the TiCN layer is 1-3 μm, that of the intermediate layer is 0.01-0.1 μm, that of the $Al_2O_3$ layer is 0.3-0.7 μm, and that of the outermost layer is 0.3-0.7 μm. The mean thickness of each layer is obtained by making thickness measurements at spaced intervals of 1 μm over a length of 10 μm or more in a direction parallel to the surface of the substrate at an optional location of each layer, and then calculating an average of measured thicknesses.

Sufficient wear resistance is retainable when the thickness of the TiCN layer is 1 μm or more. A fracture is less apt to occur when the thickness of the TiCN layer is 3 μm or less. A suitable range of the TiCN layer is 2-2.5 μm. Sufficient oxidation resistance is retainable and high wear resistance is obtainable when the thickness of the $Al_2O_3$ layer is 0.3 μm or more. Chipping is less apt to occur when the thickness of the $Al_2O_3$ layer is 0.7 μm or less. A suitable range of the $Al_2O_3$ layer is 0.4-0.6 μm.

The TiN layer is intended to enhance adhesion between the substrate and the coating layer. When the mean thickness of the TiN layer is 0.3-0.7 μm, the coating layer satisfactorily adheres to the substrate and the coating layer is less susceptible to chipping. A more suitable range of the TiN layer is 0.4-0.5 μm. The intermediate layer between the TiCN layer and the $Al_2O_3$ layer is effective in enhancing the adhesion between the TiCN layer and the $Al_2O_3$ layer. When the mean thickness of the intermediate layer is 0.01-0.1 μm, the $Al_2O_3$ layer is less apt to be peeled off and the $Al_2O_3$ layer is less susceptible to chipping. A more suitable range of the intermediate layer is 0.03-0.08 μm. The outermost layer is intended to impart a gold color to the surface of the cutting tool so as to facilitate determination as to whether a cutting edge is already used or not. This is visually distinguishable when the outermost layer has a mean thickness of 0.3-0.7 μm. On the surface of the outermost layer in the present embodiment, a $TiC_xN_y$ crystal (0<x, 0.5≤y, and x+y=1) is made up of granular particles in the cutting edge and needle-shaped particles in the rake surface. Accordingly, the surface of the coating layer has less voids and the coating layer is less subjected to wear on the cutting edge. The rake surface has a structure that the needle-shaped particles are deposited on the surface of the coating layer, and hence the surface of the coating layer has many voids, thereby improving retention ability of a cutting fluid on the surface of the coating layer. This ensures a smooth flow of chips generated during machining, and thus suppresses a temperature rise in the cutting edge. The outermost layer may contain 10% by mass or less of oxygen to a total content. Furthermore, the outermost layer located close to the substrate has a higher carbon concentration than the outermost layer located close to the surface in the structure of the present embodiment. This ensures that the needle-shaped particles are formed in the rake surface and the surface of the outermost layer has the gold color, thus making it easier to distinguish whether to be already used. The TiN layer, the intermediate layer, and the outermost layer may be omitted.

A combination of the substrate and the coating layer suppresses the thermal cracking and the propagation thereof due to heat generation during cutting. Even when the cutting edge reaches high temperatures, the $Al_2O_3$ layer suppresses oxidation of the coating layer. Additionally, the mean thickness of the $Al_2O_3$ layer is 0.3-0.7 μm, and hence the peeling off of the $Al_2O_3$ layer can be suppressed even during machining of a heat-resistant alloy that is apt to adhere, such as an Ni-based alloy and Ti-based alloy.

The cutting tool preferably has such a shape that a general shape of the cutting tool is an approximately plate shape and a side surface is disposed at 90° with respect to major surfaces, and end portions of both major surfaces are used as a cutting edge, namely, a so-called double sided negative tip shape. Although both major surfaces have the same shape, in another embodiment, a mean thickness of the $Al_2O_3$ layer on one major surface and a mean thickness of the $Al_2O_3$ layer on another major surface may differ from each other. With this structure, when a cutting process is carried out under two machining conditions, the cutting tool produces more optimum tool performance by using respectively the cutting edge on the one major surface and the cutting edge on the another major surface under different cutting conditions. On that occasion, a breaker shape on the one major surface and a breaker shape on the another major surface may differ from each other in order to achieve the more optimum tool performance.

(Second Embodiment of Coating Layer)

The structure of the coating layer is not limited to the above structure. For example, in another embodiment, a surface of the foregoing cemented carbide may be coated with a coating layer having a mean thickness of 3.0-5.5 μm and being composed of $Ti_{1-a-b}Al_aM_b(C_{1-x}N_x)$ (M is at least one kind selected from Cr, Si, W, Mo, Ta, Hf, Nb, Zr, and Y, 0.2≤a≤0.7, 0≤b≤0.4, and 0≤x≤1). This ensures a long-life cutting process in a milling process of titanium alloy or SUS. In the present embodiment, the coating layer is produced by PVD method.

Although the metal M is at least one kind selected from Cr, Si, W, Mo, Ta, Hf, Nb, Zr, and Y, oxidation resistance and adhesion resistance are further improved when the metal M includes one kind selected from Cr, Si, W, and Nb.

Although the coating layer may be made from a single composition, the present embodiment employs a multilayer structure made by alternately laminating a first thin layer and a second thin layer. The first thin layer is composed of $Ti_{1-a1-b1}Al_{a1}M_{b1}(C_{1-x1}N_{x1})$ (M is at least one kind selected from Cr, Si, W, Mo, Ta, Hf, Nb, Zr, and Y, 0.2≤a1≤0.7, 0≤b1≤0.4, and 0≤x1≤1). The second thin layer is composed of $Ti_{1-a2-b2}Al_{a2}M_{b2}(C_{1-x2}N_{x2})$ (M is at least one kind selected from Cr, Si, W, Mo, Ta, Hf, Nb, Zr, and Y, 0.2≤a2≤0.7, 0≤b2≤0.4, 0≤x2≤1, except for a1=a2, b1=b2, and x1=x2). That is, the first thin layer and the second thin layer that differ in composition are alternately laminated in a thickness of from several nanometers to dozens of nanometers. This contributes to suppression of crack propagation into the coating layer, and also allows the entirety of the coating layer to be highly hardened, thus leading to improved wear resistance.

In the present invention, the composition of the coating layer having the multilayer structure of two or more kinds of different compositions is denoted by an entire composition of the coating layer, and is analyzable with an electron probe micro analyzer (EPMA) or the like. A detailed composition of the coating layer is observable with a transmission electron microscope (TEM), and the composition thereof is confirmable by energy dispersive spectroscopy (EDS). The structure of the coating layer of the multilayer structure is not limited to the structure made up of the two kinds of the first thin layer and the second thin layer, or alternatively may be an alternating laminated structure of three or more kinds which is obtainable by adding, for example, a third thin layer having a different composition from the first thin layer and the second thin layer.

The coating layer of the multilayer structure is producible by, for example, carrying out film formation while rotating a sample subjected to the film formation in a state in which targets of different compositions are disposed at regular intervals on an inner wall side surface of a film forming apparatus.

(Production Method)

A method of producing a coated tool of the present invention is described below.

Firstly, a slurry is produced by loading, into a grinding and mixing machine, WC raw material powder whose mean particle size according to micro-tracking method is 2.5-4.0 μm, particularly 3.0-4.0 μm, and $Cr_3C_2$ raw material powder whose mean particle size according to the micro-tracking method is 2.0-3.0 μm, and then adding water or solvent thereto, followed by stirring. Here, after a mean particle size of the WC particles in an alloy falls within a predetermined range, the antimagnetic force and Rockwell hardness are adjustable to their respective predetermined ranges by carrying out pulverization using the WC raw material powder having the mean particle size of 2.5-4.0 μm while stirring the slurry until a mean particle size of the mixed powder according to the micro-tracking method reaches 0.9-1.1 μm.

The Co raw material powder is not loaded when loading the WC raw material powder and the $Cr_3C_2$ raw material powder. The Co raw material powder is added into the slurry after carrying out the pulverization while stirring the slurry until the mean particle size of the mixed powder according to the micro-tracking method reaches 2.0-2.2 μm. That is, if the Co raw material powder is loaded from the beginning, aggregation of the Co raw material powder occurs when the pulverization time is terminated. Consequently, the antimagnetic force and Rockwell hardness may be beyond their respective predetermined ranges. In order to adjust saturation magnetization of the cemented carbide after being subjected to sintering, metal powder and carbon powder are added to the slurry as needed when loading the WC raw material powder and the $Cr_3C_2$ raw material powder. In the case of adding VC raw material powder and TaC raw material powder, both are added when loading the WC raw material powder and the $Cr_3C_2$ raw material powder. The slurry is prepared by adding thereto an organic binder, a dispersing agent, or the like, and is then made into granules by spray drying.

The granules are molded into a predetermined tool shape by a well-known molding method, such as press molding, cast molding, extrusion molding, and cold isostatic press molding. This is then sintered at 1350-1450° C. in a vacuum or non-oxidation atmosphere, thus producing the cemented carbide as described above. A cooling rate after the sintering is 10-70° C./min, preferably 20-50° C./min. The cemented carbide is then subjected to the polishing process and honing process for a cutting part as needed.

Subsequently, the coating layer is formed on a surface of the cemented carbide as needed. An example of the method of forming the coating layer by chemical vapor deposition (CVD) method, which is a first embodiment, is described below. Firstly, a mixed gas is prepared which is composed of, as a reaction gas composition, 0.5-10% by volume of titanium tetrachloride ($TiCl_4$) gas, 10-60% by volume of nitrogen ($N_2$) gas, and the rest that is hydrogen ($H_2$) gas. The mixed gas is loaded into a reaction chamber so as to form a TiN layer under conditions of 800-940° C. and 8-50 kPa.

Subsequently, a mixed gas is prepared which is composed of, as a reaction gas composition, 0.5-10% by volume of titanium tetrachloride ($TiCl_4$) gas, 10-60% by volume of nitrogen ($N_2$) gas, 0.1-3.0% by volume of acetonitrile ($CH_3CN$) gas, and the rest that is hydrogen ($H_2$) gas. The mixed gas is loaded into the reaction chamber so as to form a lower part of a TiCN layer at a film forming temperature of 780-880° C. and at 5-25 kPa. Particularly in the film forming conditions, the proportion of the acetonitrile gas in the reaction gas is preferably adjusted to 0.1-0.4% by volume, and the film forming temperature is preferably adjusted to 780-880° C. in order to form the TiCN layer whose lower part is composed of fine stripe-shaped crystals (MT-TiCN) in a cross-sectional observation.

Although the film forming conditions for the lower part of the TiCN layer may be a uniform condition, the film forming conditions for the TiCN layer may be changed halfway so as to change a structure state. For example, the proportion of the acetonitrile ($CH_3CN$) gas may be increased so that an upper crystal of the TiCN layer is a columnar crystal having a larger width than a lower crystal thereof. Alternatively, the upper crystal of the TiCN layer may be a columnar crystal having a larger width than the lower crystal by changing the film forming conditions for the TiCN layer halfway. That is, a mixed gas is prepared which is composed of 1-5% by volume of titanium tetrachloride ($TiCl_4$) gas, 0.5-5% by volume of acetonitrile ($CH_3CN$) gas, 10-30% by volume of nitrogen ($N_2$) gas, and the rest that is hydrogen ($H_2$) gas. The mixed gas is loaded into the reaction chamber, and the conditions of the chamber is changed to 950-1100° C. and 5-40 kPa. A desired TiCN layer is formable even when part of the acetonitrile ($CH_3CN$) gas is replaced with 4-10% by volume of methane ($CH_4$) gas under these conditions.

Subsequently, an HT-TiCN layer constituting the upper part of the TiCN layer is formed. Specific film forming conditions for the HT-TiCN layer are preferably as follows. A mixed gas is prepared which is composed of 2.5-4% by volume of titanium tetrachloride ($TiCl_4$) gas, 0.1-10% by volume of methane ($CH_4$) gas, 5-20% by volume of nitrogen ($N_2$) gas, and the rest that is hydrogen ($H_2$) gas. The mixed gas is loaded into the reaction chamber, and the interior of the chamber is kept at 900-1050° C. and 5-40 kPa. Film forming time is 20-60 minutes.

Subsequently, an intermediate layer is formed. Specific film forming conditions are as follows. A mixed gas is prepared which is composed of 1-4% by volume of titanium tetrachloride ($TiCl_4$) gas, 0-7% by volume of methane ($CH_4$) gas, 0-20% by volume of nitrogen ($N_2$) gas, 1-5% by volume of carbon dioxide ($CO_2$) gas, and the rest that is hydrogen ($H_2$) gas. The mixed gas is loaded into the reaction chamber, and the interior of the chamber is kept at 900-1050° C. and 5-40 kPa. Film forming time is 20-60 minutes.

Subsequently, an $Al_2O_3$ layer is formed. A film forming method of the $Al_2O_3$ layer is as follows. It is preferable to use a mixed gas composed of 0.5-5.0% by volume of aluminum trichloride ($AlCl_3$) gas, 0.5-3.5% by volume of hydrogen chloride (HCl) gas, 0.5-5.0% by volume of carbon dioxide ($CO_2$) gas, 0.0-0.5% by volume of hydrogen sulfide ($H_2S$) gas, and the rest that is hydrogen ($H_2$) gas. It is preferable to keep at 950-1100° C. and 5-10 kPa.

An outermost layer is formed as needed. Specific film forming conditions are as follows. A mixed gas is prepared which is composed of, as a reaction gas composition, 0.1-10% by volume of titanium tetrachloride ($TiCl_4$) gas, 0-60% by volume of nitrogen ($N_2$) gas, and the rest that is hydrogen ($H_2$) gas. The mixed gas is loaded into the reaction chamber, and the interior of the chamber is kept at 960-1100° C. and 10-85 kPa.

As an example of a method with which a thickness of the $Al_2O_3$ layer on one major surface and a thickness of the $Al_2O_3$ layer on another major surface are made different from each other in the formation of the coating layer, there is a method with which a distance between adjacent samples on one major surface and a distance between adjacent samples on another major surface are made different from each other. Here, a cutting tool obtained in such a manner that a breaker configuration provided on opposing rake surfaces is made different from a breaker configuration provided on nonopposing rake surfaces ensures that both surfaces are usable under different cutting conditions. Additionally, a distance between upper and lower samples is made different from a distance between left and right samples, thereby ensuring that the cutting edge and the rake surface differ from each other in the thickness of the $Al_2O_3$ layer and in the crystal structure of the outermost layer.

An example of a method of forming the coating layer by physical vapor deposition (PVD) method, which is a second embodiment, is described below. As the PVD method, ion plating method and sputtering method are suitably applicable. An example of the film forming method is described in detail below. When the coating layer is formed by arc ion plating method, a metal target, a combined alloy target, or a sintered body target, which respectively independently contain metal titan (Ti), metal aluminum (Al), and a predetermined metal M (M is at least one or more kinds selected from Cr, Si, W, Mo, Ta, Hf, Nb, Zr, and Y), is set at a location on a side wall surface of the chamber.

Film forming conditions are as follows. The coating layer is formed by ion plating method or sputtering method with which a metal source is evaporated and ionized using arc discharge and glow discharge by using these targets, and at the same time the metal source is reacted with nitrogen ($N_2$) gas as a nitrogen source and methane ($CH_4$)/acetylene ($C_2H_2$) gas as a carbon source. When forming the coating layer, a bias voltage of 35-200 V is applied in the present embodiment in order to produce the high-hardness coating layer and enhance adhesion with a substrate in consideration of the crystal structure of the coating layer.

The laminated film having the above-mentioned thin layers alternately laminated one on another is producible by setting a first target and a second target at predetermined locations, such as opposing locations on the side wall surface of the chamber, and then carrying out film formation while rotating the samples so as to be brought near or separated from the first target and the second target.

Example 1

Metal cobalt (Co) powder having a mean particle size of 1.2 μm and $Cr_3C_2$ powder having a mean particle size of 2.5 μm were added to and mixed with tungsten carbide (WC) powder having a mean particle size as presented in Table 1, followed by pulverization with a vibration mill until a mean particle size of a mixed powder falls within a range of 0.9-1.1 μm. Here, in a sample whose addition timing is presented as being halfway with regard to the addition of Co in Table 1, the Co powder was added at a point in time that the mean particle size of the mixed powder in the middle of the pulverization fell within a range of 2.0-2.2 μm. In a sample whose addition timing is presented as being initially, the Co powder was added before starting the pulverization.

Thereafter, the mixed powder obtained by spray drying granulation was molded into a cutting tool shape by press molding, followed by debinding process. This was then sintered at a temperature presented in Table 1 in a vacuum having a degree of vacuum of 0.5-100 Pa for one hour, and the temperature thereof was then decreased at a temperature decrease rate presented in Table 1, thereby producing a cemented carbide presented in Table 1. Individual metal contents in the cemented carbide after subjected to sintering were identical to those of a prepared composition. A side of the produced cemented carbide which corresponds to a rake surface is subjected to edge treatment (round honing) by blast processing.

Subsequently, a coating layer was formed on the cemented carbide by CVD method. Firstly, a TiN layer was formed in a thickness of 0.1 μm by flowing a mixed gas made up of 2.0% by volume of $TiCl_4$, 33% by volume of $N_2$, and the rest that was $H_2$ under film forming conditions of 880° C. and 16 kPa. Then, a first TiCN layer having a means crystal width of 0.3 μm was formed in a thickness of 2.5 μm by flowing a mixed gas made up of 2.5% by volume of $TiCl_4$, 23% by volume of $N_2$, 0.4% by volume of $CH_3CN$, and the rest that was $H_2$ under film forming conditions of 825° C. and 9 kPa. Then, an intermediate layer was formed in a thickness of 0.1 μm by flowing a mixed gas made up of 3.5% by volume of $TiCl_4$, 0-3% by volume of $CH_4$, 0-10% by volume of $N_2$, 2% by volume of $CO_2$, and the rest that was $H_2$ gas under film forming conditions of 1010° C. and 20 kPa. Subsequently, an $\alpha Al_2O_3$ layer was formed in a thickness of 0.5 μm by flowing a mixed gas made up of 1.5% by volume of $AlCl_3$, 2% by volume of HCl, 4% by volume of $CO_2$, 0.3% by volume of $H_2S$, and the rest that was $H_2$ gas under film forming conditions of 1005° C. and 9 kPa. Finally, an outermost layer was formed in a thickness of 0.5 μm by flowing a mixed gas made up of 3.0% by volume of $TiCl_4$, 30% by volume of $N_2$, and the rest that was $H_2$ under film forming conditions of 1010° C. and 30 Pa. The outermost layer is composed basically of TiN, however, results in TiCN because contamination occurred due to diffusion of carbon (C), or the like.

The following measurements were made for each of the obtained cutting tools. Antimagnetic force (Hc) and saturation magnetization (Ms) were measured by a magnetic characteristic measuring device. Rockwell hardness was measured according to JISZ2245. Fracture toughness value ($K_{1C}$) was measured according to JISR1607. The cutting tools were respectively cut off into a rectangular shape having a length of 11.5 mm and a depth-width-length ratio of 3:4:10, and deflective strength (three-point bending strength) and Weibull coefficient were measured and calculated according to JISR1601 and JISR1625, respectively. The results were presented in Table 2.

A composition analysis of bonding phases in a cut surface of each of the cutting tools was made by wavelength dispersive X-ray analysis (WDS) to confirm the content of tungsten in the bonding phases. The content of tungsten in the bonding phases scattering at depths in a range of 500-600 μm from the surface of an alloy carbide was measured at their respective locations. The content of tungsten in each of the bonding phases scattering at depths in a range of not more than 300 μm from the surface of the alloy was also measured. When there was a region in which the content of tungsten in the bonding phases in the range from the surface to the depth of 300 μm is higher than the content of solid-melted tungsten in the range of 500-600 μm, a depth at which the content of tungsten reaches a maximum value was confirmed. The results were present in Table 2. A sample without a region, in which the content of tungsten from the interior to the surface remained unchanged, namely, a region having a higher content than the content of solid-melted tungsten in the range from the surface to the depth of 300 μm, is denoted by the term "uniform."

Wear resistance and fracture resistance were evaluated by conducting a cutting test using these cutting tools under the following conditions. The results were presented in Table 3.
(Cutting Conditions)
Workpiece: Bar material of Inconel 718
Tool shape: PNMU1205ANER-GM (Insert produced by KYOCERA CORPORATION)
Cutting speed: 40 m/min
Feed rate: 0.15 mm/cutting edge
Depth of cut: 2.0 mm (axial direction)×10 mm (radial direction)
Others: Using water soluble cutting fluid
Evaluated items: Cutting of ten corners of each sample was carried out to measure and calculate average cutting time passed until being fractured, and cutting time passed until being fractured in the shortest time. With regard to a sample that ensured machining during cutting for five minutes, the amount of wear on the flank surface during the cutting for five minutes was measured.

TABLE 1

| | Raw material composition (% by mass) | | | | | | Sintering condition | |
|---|---|---|---|---|---|---|---|---|
| | WC | | Co | | Addition | Others | | |
| Sample No | Addition amount | Mean particle size (μm) | Addition amount | Addition timing | amount of $Cr_3C_2$ | Kind | Addition amount | Sintering temperature (° C.) | Temperature decrease rate (° C./Minute) |
| 1 | Rest | 3.5 | 12.0 | Halfway | 0.5 | — | | 1400 | 45 |
| 2 | Rest | 3.0 | 12.0 | Halfway | 0.5 | — | | 1325 | 60 |
| 3 | Rest | 3.5 | 12.0 | Halfway | 0.5 | — | | 1380 | 20 |
| 4 | Rest | 4.0 | 12.0 | Halfway | 0.5 | — | | 1390 | 30 |
| 5 | Rest | 4.5 | 12.0 | Halfway | 0.5 | — | | 1475 | 7 |
| 6 | Rest | 3.5 | 11.0 | Halfway | 0.5 | — | | 1450 | 10 |
| 7 | Rest | 3.5 | 11.5 | Halfway | 0.5 | — | | 1425 | 40 |
| 8 | Rest | 3.5 | 12.5 | Halfway | 0.5 | — | | 1425 | 20 |
| 9 | Rest | 3.5 | 13.0 | Halfway | 0.5 | — | | 1400 | 10 |
| 10 | Rest | 3.5 | 12.0 | Halfway | 0.1 | — | | 1400 | 30 |

TABLE 1-continued

| | Raw material composition (% by mass) | | | | | | | Sintering condition | |
|---|---|---|---|---|---|---|---|---|---|
| | WC | | Co | | Addition | Others | | Sintering | Temperature |
| Sample No | Addition amount | Mean particle size (μm) | Addition amount | Addition timing | amount of Cr₃C₂ | Kind | Addition amount | temperature (° C.) | decrease rate (° C./Minute) |
| 11 | Rest | 3.5 | 12.0 | Halfway | 0.2 | — | | 1400 | 20 |
| 12 | Rest | 3.5 | 12.0 | Halfway | 0.6 | — | | 1400 | 20 |
| 13 | Rest | 3.5 | 12.0 | Halfway | 0.7 | — | | 1400 | 20 |
| 14 | Rest | 3.5 | 12.0 | Halfway | 0.5 | Ta | 0.1 | 1375 | 20 |
| 15 | Rest | 9.0 | 12.0 | Initially | 0.5 | — | | 1475 | 20 |
| 16 | Rest | 3.5 | 12.0 | Halfway | 0.5 | — | | 1425 | 30 |
| 17 | Rest | 2.5 | 12.0 | Halfway | 0.5 | — | | 1400 | 50 |
| 18 | Rest | 1.0 | 12.0 | Initially | 0.5 | — | | 1400 | 100 |
| 19 | Rest | 2.0 | 12.5 | Halfway | 0.5 | — | | 1425 | 10 |
| 20 | Rest | 3.0 | 12.0 | Halfway | 0.5 | — | | 1425 | 30 |
| 21 | Rest | 3.5 | 11.5 | Halfway | 0.5 | — | | 1425 | 50 |
| 22 | Rest | 4.0 | 11.5 | Halfway | 0.4 | — | | 1425 | 50 |
| 23 | Rest | 2.5 | 12.5 | Halfway | 0.4 | — | | 1425 | 50 |
| 24 | Rest | 3.5 | 11.5 | Halfway | 0.4 | — | | 1350 | 50 |
| 25 | Rest | 3.5 | 11.5 | Halfway | 0.4 | — | | 1375 | 50 |
| 26 | Rest | 3.5 | 12.5 | Halfway | 0.4 | — | | 1400 | 50 |
| 27 | Rest | 3.5 | 12.5 | Halfway | 0.4 | — | | 1350 | 55 |
| 28 | Rest | 3.5 | 12.0 | Halfway | 0.2 | — | | 1450 | 20 |
| 29 | Rest | 4.0 | 12.0 | Halfway | 0.4 | — | | 1400 | 50 |

TABLE 2

| | Cemented carbide | | | | | | | |
|---|---|---|---|---|---|---|---|---|
| | Mean | | | Deflective strength | | Saturation | $K_{1c}$ | W |
| Sample No | particle size of WC (μm) | Hc (kA/m) | HRA | Average (GPa) | Weibull Coefficient | magnetization (kA/m) | (MPa·m$^{1/2}$) | distribution Depth (μm) |
| 1 | 0.95 | 15.0 | 90.0 | 3.9 | 20 | 180 | 17.0 | 100 |
| 2 | 0.80 | 15.8 | 90.4 | 3.8 | 7 | 207 | 14.8 | 20 |
| 3 | 0.85 | 15.3 | 90.1 | 3.7 | 13 | 195 | 16.3 | 60 |
| 4 | 1.05 | 14.2 | 89.7 | 3.6 | 12 | 171 | 17.2 | 80 |
| 5 | 1.10 | 13.1 | 89.6 | 3.2 | 14 | 159 | 18.2 | 130 |
| 6 | 0.95 | 15.8 | 90.4 | 3.2 | 10 | 162 | 14.8 | 50 |
| 7 | 0.95 | 15.2 | 90.0 | 3.6 | 12 | 169 | 16.2 | 60 |
| 8 | 0.92 | 14.5 | 89.7 | 3.7 | 11 | 188 | 16.7 | 65 |
| 9 | 0.90 | 13.2 | 89.6 | 3.7 | 15 | 204 | 17.2 | 70 |
| 10 | 1.02 | 15.8 | 90.4 | 3.3 | 8 | 161 | 15.3 | 60 |
| 11 | 0.99 | 15.7 | 89.7 | 3.8 | 13 | 184 | 17.1 | 90 |
| 12 | 0.87 | 13.6 | 89.6 | 3.6 | 11 | 168 | 16.5 | 50 |
| 13 | 0.82 | 13.2 | 90.4 | 3.3 | 8 | 166 | 16.2 | 10 |
| 14 | 0.87 | 15.8 | 89.7 | 3.4 | 10 | 166 | 16.1 | Uniform |
| 15 | 1.03 | 12.5 | 89.9 | 3.7 | 5 | 208 | 17.7 | 185 |
| 16 | 0.99 | 13.0 | 89.8 | 3.9 | 14 | 189 | 17.1 | 55 |
| 17 | 0.91 | 16.0 | 90.3 | 3.7 | 8 | 167 | 16.4 | 170 |
| 18 | 0.85 | 17.0 | 90.7 | 3.8 | 2 | 160 | 14.2 | Uniform |
| 19 | 1.05 | 15.8 | 89.0 | 3.1 | 11 | 210 | 17.5 | 40 |
| 20 | 0.95 | 15.2 | 89.5 | 3.9 | 7 | 189 | 17.1 | 60 |
| 21 | 0.85 | 15.8 | 90.5 | 3.8 | 11 | 171 | 16.5 | 100 |
| 22 | 0.85 | 15.2 | 91.0 | 3.8 | 7 | 152 | 15.8 | 115 |
| 23 | 0.90 | 15.8 | 90.2 | 3.5 | 5 | 164 | 15.8 | 205 |
| 24 | 0.87 | 13.6 | 89.6 | 4.2 | 20 | 201 | 18.2 | 35 |
| 25 | 0.95 | 15.9 | 90.4 | 3.3 | 9 | 165 | 16.1 | 40 |
| 26 | 1.00 | 14.4 | 89.6 | 3.4 | 15 | 200 | 18.0 | 45 |
| 27 | 0.90 | 15.5 | 90.1 | 3.8 | 7 | 161 | 15.3 | 50 |
| 28 | 0.95 | 14.8 | 89.9 | 3.2 | 7 | 163 | 15.5 | Uniform |
| 29 | 0.88 | 15.2 | 89.7 | 3.4 | 6 | 162 | 15.5 | 40 |

TABLE 3

| Sample No | Cutting test | | |
|---|---|---|---|
| | Average fracture time (minute) | Shortest fracture time (minute) | Amount of wear (mm) |
| 1 | 20 | 18 | 0.12 |
| 2 | 6 | 4 | 0.14 |
| 3 | 17 | 13 | 0.15 |
| 4 | 18 | 14 | 0.18 |
| 5 | 18 | 10 | 0.25 |
| 6 | 7 | 5 | 0.13 |
| 7 | 18 | 13 | 0.13 |
| 8 | 18 | 13 | 0.17 |
| 9 | 18 | 12 | 0.27 |
| 10 | 9 | 7 | 0.20 |
| 11 | 19 | 11 | 0.19 |
| 12 | 18 | 12 | 0.14 |
| 13 | 8 | 2 | 0.15 |
| 14 | 13 | 11 | 0.16 |
| 15 | 7 | 3 | 0.23 |
| 16 | 17 | 15 | 0.14 |
| 17 | 16 | 13 | 0.13 |
| 18 | 13 | 6 | 0.15 |
| 19 | 12 | 9 | 0.22 |
| 20 | 15 | 12 | 0.16 |
| 21 | 15 | 11 | 0.14 |
| 22 | 9 | 4 | 0.13 |
| 23 | 10 | 7 | 0.16 |
| 24 | 18 | 16 | 0.12 |
| 25 | 15 | 10 | 0.13 |
| 26 | 16 | 15 | 0.20 |
| 27 | 16 | 9 | 0.15 |
| 28 | 15 | 8 | 0.17 |
| 29 | 14 | 6 | 0.14 |

The following is apparent from Tables 1 to 3. That is, Sample No. 2, whose WC phase had a mean particle size of less than 0.85 μm, had low toughness and was suddenly fractured. Sample No. 5, whose WC phases had a mean particle size of more than 1.05 μm, significantly worn. Sample No. 6 whose Co content was less than 11.5% by mass was fractured. Sample No. 9, whose Co content was more than 12.5% by mass, was fractured due to the thermal cracking and significant wear. Sample No. 10, whose $Cr_3C_2$ content was less than 0.2% by mass, was subjected to corrosion due to oxidation of the bonding phase on the surface of the cemented carbide, and was also fractured. Sample No. 13, whose $Cr_3C_2$ content was more than 0.6% by mass, was fractured due to toughness deterioration. Sample No. 15, whose antimagnetic force was lower than 13 kA/m, was fractured by a rapid propagation of wear. Sample No. 18, whose antimagnetic force was higher than 16 kA/m, was suddenly fractured due to thermal cracking. Sample No. 19, whose Rockwell hardness was lower than 89.5, significantly worn. Sample No. 22, whose Rockwell hardness was higher than 90.5, was subjected to chipping.

On the other hand, in Sample Nos. 1, 3, 4, 7, 8, 11, 12, 14, 16, 17, 20, 21, 23-29, which were respectively made up of the substrate and the coating layer within the scope of the present invention, chipping and a fracture were suppressed and the propagation of wear was also suppressed.

Example 2

Coating layers presented in Table 4 were respectively formed by CVD method using the same material as the cemented carbide of Sample No. 1 in Example 1. A TiN layer as a first layer was formed in a thickness presented in Table 4 under the same film forming conditions as Example 1. A TiCN layer as a second layer was formed by flowing a mixed gas made up of 2.5% by volume of $TiCl_4$, 23% by volume of $N_2$, $CH_3CN$, whose content was initially 0.2% by volume and was 0.5% by volume at the termination of the film formation by gradually increasing a flow rate, and the rest that was $H_2$, at 825° C. and 9 kPa. An intermediate layer as a third layer was formed in a thickness presented in Table 4 under the same film forming conditions as Example 1. An $\alpha Al_2O_3$ layer as a fourth layer was formed by flowing a mixed gas made up of 2.5% by volume of $AlCl_3$, 0.5% by volume of HCl, 4% by volume of $CO_2$, 0.3% by volume of $H_2S$, and the rest that was $H_2$ under film forming conditions of 1005° C. and 9 kPa. An outermost layer was formed in a thickness presented in Table 4 under the same film forming conditions as Example 1.

Cutting performance was evaluated by conducting a cutting test of the obtained cutting tools under the cutting conditions in Example 1. The results were presented in Table 4.

TABLE 4

| | Coating layer (composition: average thickness(μm)) | | | | | Cutting test | | |
|---|---|---|---|---|---|---|---|---|
| Sample No. | TiN layer | TiCN layer | Intermediate layer | $Al_2O_3$ layer | Outermost layer | Average fracture time (minute) | Shortest fracture time (minute) | Amount of wear (mm) |
| 30 | 0.5 | 2 | TiCNO 0.05 | 0.5 | Ti(CN) 0.5 | 24 | 21 | 0.10 |
| 31 | 0.6 | 2.5 | TiCNO 0.07 | 0.5 | Ti(CN) 0.5 | 22 | 18 | 0.10 |
| 32 | 0.7 | 1.8 | TiNO 0.05 | 0.6 | Ti(CN) 0.5 | 22 | 20 | 0.10 |
| 33 | — | 2.4 | TiCO 0.03 | 0.4 | Ti(CN) 0.5 | 15 | 10 | 0.13 |
| 34 | 0.4 | 2 | TiCNO 0.06 | 0.4 | Ti(CN) 0.5 | 24 | 21 | 0.12 |
| 35 | 0.5 | 2.2 | TiCNO 0.04 | 0.5 | Ti(CN) 0.5 | 24 | 18 | 0.10 |
| 36 | 0.5 | 1 | TiCO 0.02 | 0.6 | Ti(CN) 1.0 | 20 | 15 | 0.15 |
| 37 | 0.4 | 3 | TiCNO 0.1 | 0.4 | Ti(CN) 0.2 | 18 | 15 | 0.12 |
| 38 | 0.3 | 2.8 | TiCNO 0.01 | 0.3 | Ti(CN) 0.5 | 18 | 12 | 0.14 |

TABLE 4-continued

| | Coating layer (composition: average thickness(μm)) | | | | | Cutting test | | |
|---|---|---|---|---|---|---|---|---|
| | | | | | | Average fracture time | Shortest fracture time | Amount of wear |
| Sample No. | TiN layer | TiCN layer | Intermediate layer | $Al_2O_3$ layer | Outermost layer | (minute) | (minute) | (mm) |
| 39 | 0.8 | 1.3 | TiCNO 0.11 | 0.7 | Ti(CN) 0.5 | 18 | 16 | 0.15 |
| 40 | 0.5 | 2 | TiCNO 0.05 | 0.4 | — | 20 | 18 | 0.18 |

Table 4 shows that chipping and a fracture were suppressed and the propagation of wear was also suppressed in all of Sample Nos. 30-40.

Example 3

Coating layers are respectively formed by PVD method using the same materials as the cemented carbide of Sample No. 1 in Example 1. Specifically, sintered body targets containing metal elements for forming the coating layers were set and a bias voltage presented in Table 5 was applied thereto, and an arc current 150 A was passed therethrough at a film forming temperature of 540° C., thereby forming the coating layers having their respective compositions presented in Table 5.

The composition of each sample was observed from the surface of the coating layer by a scanning electron microscope (SEM), and a mean composition of three locations was presented as the composition of the coating layer. A cross section including the coating layer of each sample was observed with the SEM to measure a thickness of the coating layer. Further, a detailed structure of the coating layer was observed with a transmission electron microscope (TEM), and the detailed structure was confirmed by an energy dispersive spectroscopy (EDS).

Cutting performance was evaluated under the following conditions. The results were presented in Table 6.
(Cutting Conditions)
Workpiece: Bar material of Ti-6Al-4V alloy
Tool shape: PNMU1205ANER-SM (Insert produced by KYOCERA CORPORATION)
Cutting speed: 60 m/min
Feed rate: 0.25 mm/cutting edge Depth of cut: 2.0 mm (axial direction)×10 mm (radial direction)

Others: Using water soluble cutting fluid

Evaluation method: Machining time until being fractured, and a cutting edge state after machining for 30 minutes

TABLE 5

| | Bias | | Detailed constitution of coating layer | |
|---|---|---|---|---|
| Sample No. | voltage (V) | Entire composition of coating layer | Layer A | Layer B |
| 41 | 75 | $Al_{0.50}Ti_{0.50}N$ | Single layer | — |
| 42 | 75 | $Al_{0.48}Ti_{0.48}Si_{0.04}N$ | Laminated layer (Upper layer: Layer A-Lower layer: Layer B) | $Al_{0.45}Ti_{0.5}Si_{0.10}N$ $Al_{0.50}Ti_{0.50}N$ |
| 43 | 100 | $Al_{0.52}Ti_{0.27}Cr_{0.16}Nb_{0.03}W_{0.01}Si_{0.01}N$ | Repeated laminated layer of Layer A/Layer B (60/60 layer) | $Al_{0.39}Ti_{0.53}Nb_{0.06}W_{0.02}N$ $Al_{0.65}Cr_{0.33}Si_{0.02}N$ |
| 44 | 75 | $Al_{0.40}Ti_{0.43}Cr_{0.17}C_{0.2}N_{0.8}$ | Single layer | — |
| 45 | 150 | $Al_{0.30}Ti_{0.50}Mo_{0.10}Y_{0.10}N$ | Single layer | — |
| 46 | 50 | $Al_{0.52}Ti_{0.32}Cr_{0.12}Si_{0.04}N$ | Repeated laminated layer of Layer A/Layer B (70/70 layer) | $Al_{0.65}Ti_{0.15}Cr_{0.20}N$ $Al_{0.33}Ti_{0.57}Si_{0.10}N$ |
| 47 | 150 | $Al_{0.31}Ti_{0.58}Ta_{0.06}Zr_{0.04}Hf_{0.01}N$ | Repeated laminated layer of Layer A/Layer B (60/60 layer) | $Al_{0.50}Ti_{0.38}Ta_{0.12}N$ $Al_{0.12}Ti_{78}Zr_{0.08}Hf_{0.02}N$ |
| 48 | 75 | $Al_{0.58}Ti_{0.38}Nb_{0.04}N$ | Repeated laminated layer of Layer A/Layer B (60/60 layer) | $Al_{0.70}Ti_{0.20}Nb_{0.10}N$ $Al_{0.50}Ti_{0.50}N$ |

TABLE 6

| | | Cutting performance | |
|---|---|---|---|
| Sample No | Thickness (μm) | Machining time (minute) | Condition of cutting edge |
| 41 | 5.5 | 40 | Satisfactory |
| 42 | 3.5 | 43 | Satisfactory |
| 43 | 4.0 | 48 | Satisfactory |
| 44 | 3.0 | 36 | Minor chipping |
| 45 | 5.0 | 37 | Minor chipping |
| 46 | 4.5 | 47 | Satisfactory |
| 47 | 4.0 | 40 | Satisfactory |
| 48 | 4.0 | 45 | Satisfactory |

Tables 5 and 6 show that chipping and a fracture were suppressed and a long-life cutting process was ensured in all of the sample Nos. 41-48.

The invention claimed is:

1. A cutting tool comprising:
a cemented carbide that is composed mainly of a WC phase and contains 11.5-12.5% by mass of Co and 0.2-0.6% by mass of Cr in terms of $Cr_3C_2$, wherein the WC phase has a mean particle size of 0.85-1.05 μm, the cemented carbide has an antimagnetic force (Hc) of 13.0-16.0 kA/m, and a Rockwell hardness (HRA) of 89.5-90.5,
the Co exists in a bonding phase that establishes a bond between the WC phases,
tungsten (W) is contained in the bonding phase, and
a content ratio of the tungsten reaches a maximum value at a location which lies at depths in a range of 50-200 μm from a surface of the cemented carbide.

2. The cutting tool according to claim 1, wherein a deflective strength is 3.5 GPa or more, and a Weibull coefficient is 10 or more.

3. The cutting tool according to claim 1, wherein saturation magnetization (Ms) is 165-200 kA/m, and a fracture toughness value ($K_{1C}$) is 16 MPa·m$^{1/2}$ or more.

4. The cutting tool according to claim 1, wherein the surface of the cemented carbide is coated with a coating layer.

5. The cutting tool according to claim 4, wherein the cemented carbide has on the surface a TiN layer having a mean thickness of 0-0.7 μm, a TiCN layer having a mean thickness of 1-3 μm, an intermediate layer having a mean thickness of 0-0.1 μm and being composed of any one of TiCO, TiNO, and TiCNO, an $Al_2O_3$ layer having a mean thickness of 0.3-0.7 μm, and an outermost layer made of a $TiC_xN_y$ layer (0<x, 0.5≤y, and x+y=1) having a mean thickness of 0-0.7 μm, these layers being laminated in sequence from a substrate side.

6. The cutting tool according to claim 4, wherein the surface of the cemented carbide is coated with a coating layer having a mean thickness of 3.0-5.5 μm and being composed of $Ti_{1-a-b}Al_aM_b(C_{1-x}N_x)$ (M is at least one kind selected from Cr, Si, W, Mo, Ta, Hf, Nb, Zr, and Y, 0.2≤a≤0.7, 0≤b≤0.4, and 0≤x≤1).

7. The cutting tool according to claim 6, wherein the coating layer comprises a multilayer structure made by alternately laminating a first thin layer composed of $Ti_{1-a1-b1}Al_{a1}M_{b1}(C_{1-x1}N_{x1})$ (M is at least one kind selected from Cr, Si, W, Mo, Ta, Hf, Nb, Zr, and Y, 0.2≤a1≤0.7, 0≤b1≤0.4, and 0≤x1≤1), and a second thin layer composed of $Ti_{1-a2-b2}Al_{a2}M_{b2}(C_{1-x2}N_{x2})$ (M is at least one kind selected from Cr, Si, W, Mo, Ta, Hf, Nb, Zr, and Y, 0.2≤a2≤0.7, 0≤b2≤0.4, 0≤x2≤1, except for a1=a2, b1=b2, and x1=x2).

* * * * *